United States Patent
Rees

[15] 3,700,375
[45] Oct. 24, 1972

[54] INJECTION-MOLDING MACHINE WITH ALARM DEVICE

[72] Inventor: Herbert Rees, Toronto, Ontario, Canada

[73] Assignee: Husky Manufacturing and Tool Works Ltd., Bolton, Ontario, Canada

[22] Filed: July 14, 1969

[21] Appl. No.: 841,634

Related U.S. Application Data

[63] Continuation-in-part of Ser. No. 597,641, Nov. 29, 1966, Pat. No. 3,454,991.

[52] U.S. Cl. ................... 425/422, 425/444, 425/455
[51] Int. Cl. .......................... B29c 7/00, B29c 17/07
[58] Field of Search .. 18/30 CM, 30 CS, 30 R, 2 RM, 18/2 RA, 2 RC, DIG. 60, DIG. 45; 164/151, 269, 4, 408, 344; 25/2; 137/557; 214/6 SF

[56] References Cited

UNITED STATES PATENTS

| | | | |
|---|---|---|---|
| 2,257,732 | 10/1941 | Clark | 18/2 RM UX |
| 2,759,221 | 8/1956 | Edwards | 18/2 RM UX |
| 2,941,499 | 6/1960 | Gutzmer | 214/6 FS X |
| 3,070,843 | 1/1963 | Jurgeleit | 18/2 RM X |
| 3,200,787 | 8/1965 | Darnell | 137/557 X |
| 3,223,068 | 12/1965 | Van Winkle | 137/557 X |
| 3,303,537 | 2/1967 | Mislan | 18/2 RM UX |
| 3,454,991 | 7/1969 | Rees | 425/169 |

Primary Examiner—J. Spencer Overholser
Assistant Examiner—Norman E. Lehrer
Attorney—Karl F. Ross

[57] ABSTRACT

A take-off member, interposable between a movable mold portion and its mate to receive the molded articles for removing them from the mold, has a seat for a molded article adjacent a chamber connected to a source of vacuum (or fluid pressure) by way of a pressure sensor which detects the lack of buildup of a pressure differential, caused by the absence of a molded article from the seat, to give an alarm signal.

2 Claims, 1 Drawing Figure

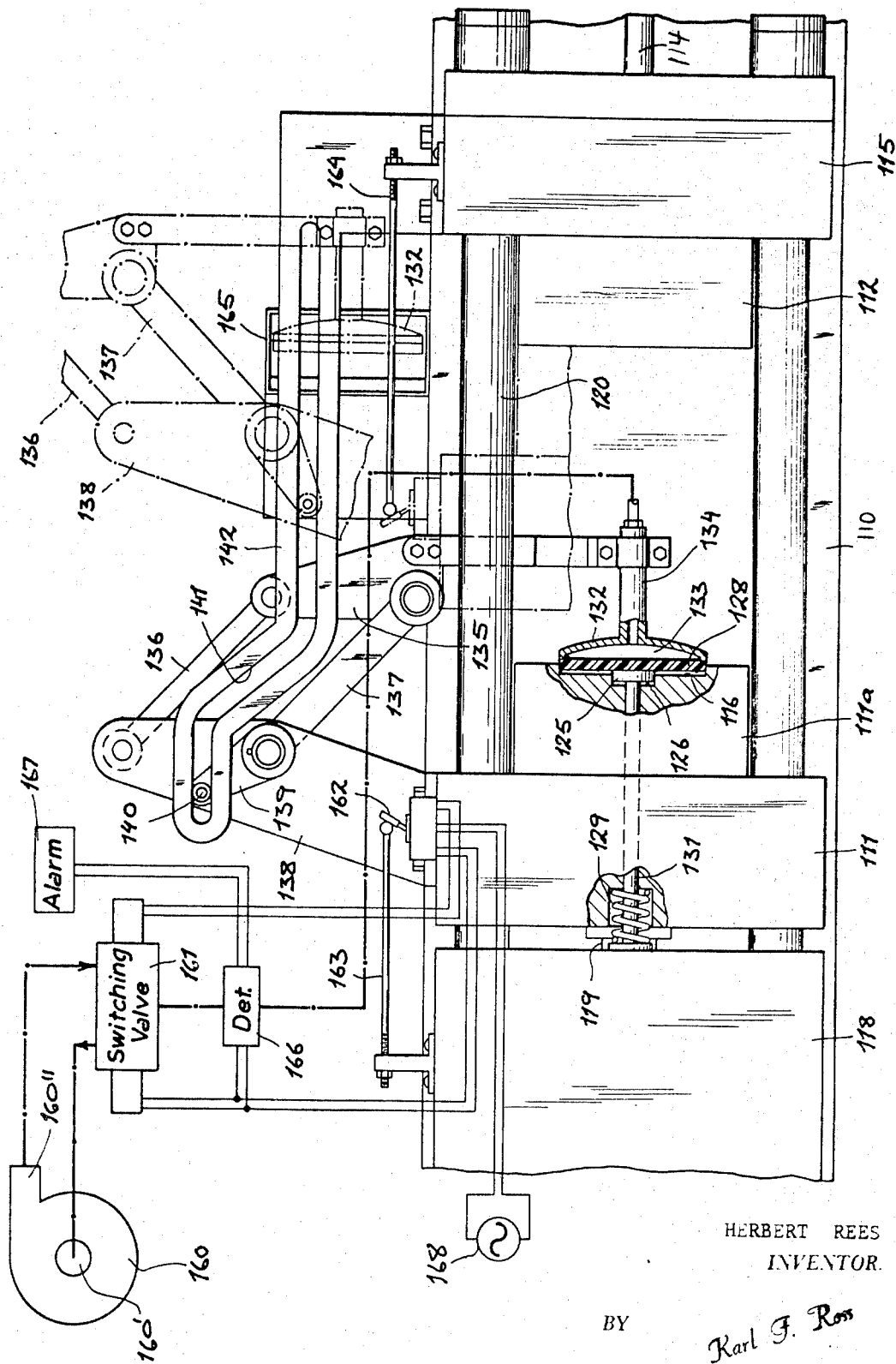

INJECTION-MOLDING MACHINE WITH ALARM DEVICE

This application is a continuation-in-part of my co-pending application Ser. No. 597,641 filed Nov. 29, 1966, now U.S. Pat. No. 3,454,991.

My present invention relates to a molding machine of the type wherein two relatively movable mold portions, one of which may be substantially stationary, co-operate with a take-off member which is interposable between these mold portions in an open condition thereof to receive one or more molded articles and to entrain same from the region of the mold portions preparatorily to reclosure and performance of a new molding operation, with subsequent discharge of the entrained article or articles from the take-off member at a location remote from the mold path and in timed relationship with the mold cycle.

The general object of my present invention is to provide means for indicating, in a simple and reliable manner, the presence or absence of a molded article on the take-off member at the instant of its withdrawal from juxtaposition with a coacting mold portion in order that, if the machine has failed to produce the prescribed number of articles in a preceding mold cycle or has turned out a defective article, the operation may be discontinued manually or automatically for purposes of inspection and repair.

As already described in my above-identified application and patent, this object can be realized by the provision of a suction line terminating at a vacuum chamber formed in the take-off member in the vicinity of the seat for the molded article, a detector connected to that line sensing the nondevelopment of an expected pressure drop to actuate an alarm device.

In general, in accordance with my present invention, such an alarm can also be given by a detector responsive to nondevelopment of an expected pressure rise upon the application of an elevated fluid pressure to either the take-off member or an adjoining mold cavity in the region of the seat receiving the molded article.

Thus, in accordance with the present invention, I provide pneumatic means including fluid lines terminating in the region of such seat for helping transfer a molded article from the mold cavity to a take-off member and for actuating an alarm if a predetermined pressure below or above atmospheric level, indicative of the presence of a molded article on the seat, fails to materialize.

The invention will be described in greater detail hereinafter with reference to the accompanying drawing the sole FIGURE of which is a side-elevational view, partly in section, illustrating a molding machine embodying my present improvement.

The machine shown in the drawing is generally similar to that described in my U.S. Pat. No. 3,254,371 and comprises a base 110 which contains the various motors and controls necessary for operating the principal parts of the machine, i.e., its movable mold portion 111, co-operating with a stationary mold portion 112, and its injection piston (not shown) within a cylinder housing which communicates via a channel 114 with an injection chamber within a fixed backing plate 115. The housing 118 for the mold drive contains a ram 119 reciprocally lodged therein, this ram being rigid with mold portion 111. The latter rides on horizontal rails or tie rods 120 and has an extension 111a formed with a recess 116 which, together with stationary mold 112, defines a cavity for flat, disk-shaped articles 128 to be molded.

The admission of masticated and liquefied plastic material to the aforementioned mold cavity takes place by a conventional injection system which has not been illustrated and which operates in synchronism with the periodic reciprocation of mold portion 111 as is well known per se.

An ejection rod 131, rearwardly biased by a coil spring 129, terminates in a head 125 centrally positioned within a recess 126 of mold part 111a. In the terminal position shown in full lines, head 125 dislodges the article 128 from its cavity 116 and transfers it to a take-off plate 132 which is bowl-shaped and forms a vacuum chamber 133 communicating via a conduit 134 with a blower 160. A switching valve 161, controlled by a reversing switch 162 which is tripped by stops 163, 164 in the limiting positions of mold portion 111, alternately connects conduit 134 with the intake port 160' (during the mold-closing stroke) and with the discharge part 160'' (during the mold-opening stroke) of blower 160. In the elevated terminal position of take-off plate 132 (dot-dash lines) the reversal of switch 162 and the consequent application of air pressure to workpiece 128 releases the latter from its seat and throws it into a chute 165 leading to a receptacle not shown. A low-pressure detector 166, deactivated by switch 162 during every unloading phase (coinciding with the mold-opening stroke), responds to failure of vacuum in conduit 134 during any transfer phase (coinciding with the mold-closing stroke) to actuate an alarm 167; the triggering of this alarm, indicating absence or defective nature of a workpiece 128, may alert an operator or may directly stop the machine. An electric power supply for valve 161, detector 166 and alarm 167 has been shown at 168.

Naturally, take-off plates and transfer members adapted to accommodate more than one molded article at a time may also be used in a system of the type described.

If fluid pressure from port 160'' rather than suction from port 160' were applied to line 134 in the take-off position illustrated in the drawing, the absence of a molded disk 128 from its seat at the rim of the take-off member 132 would allow the air from blower 160 to escape along that rim, thereby preventing the buildup of an elevated pressure in the line. With detector 166 suitably adjusted to sense the absence of such pressure buildup at the proper time of the cycle (i.e., during closure of switch 162), alarm 167 could again be actuated to indicate mold failure.

I claim:

1. In an injection-molding machine having two relatively movable mold portions which define at least one cavity provided with inlet means for admitting a hardenable plastic material to form at least one molded article, the combination therewith of:

a take-off member reciprocably mounted for interposition between said mold portions in an open condition thereof and movement into a discharge position remote from the path of said mold portions, said take-off member being provided with holding means forming a seat for a molded article and with an air chamber adjacent said seat;

drive means for periodically reciprocating said member in synchronism with the movement of said mold portions, the latter being reclosed preparatorily to performance of a new molding operation upon removal of said take-off member to said discharge position;

conduit means terminating at said air chamber;

a vacuum source and a high-pressure source alternately connectable to said air chamber by way of said conduit means;

switchover means controlled by said drive means for connecting said vacuum source to said air chamber during a transfer phase terminating upon the removal of said member to said discharge position and for connecting said high-pressure source to said air chamber during a subsequent unloading phase whereby a molded article is entrained from said cavity by said take-off member on said seat and is thereafter dislodged therefrom;

pressure-sensing means connected to said conduit means for detecting the development of a vacuum in said air chamber during said transfer phase, said pressure-sensing means being coupled to said switchover means for deactivation during said unloading phase; and alarm means connected to said pressure-sensing means for operation thereby in the absence of a vacuum during said transfer phase.

2. The combination defined in claim 1 wherein said switchover means comprises limit-switch means operable in terminal positions of one of said mold portions for reversing the movement thereof.

* * * * *